United States Patent
Meehan

(10) Patent No.: US 12,134,752 B2
(45) Date of Patent: Nov. 5, 2024

(54) APPARATUS FOR PUNCHING DOWN A WINE CAP

(71) Applicant: Larry Joseph Meehan, Lincoln, CA (US)

(72) Inventor: Larry Joseph Meehan, Lincoln, CA (US)

(73) Assignee: Larry Joseph Meehan, Lincoln, CA (US)

( * ) Notice: Subject to any disclaimer, the term of this patent is extended or adjusted under 35 U.S.C. 154(b) by 655 days.

(21) Appl. No.: 17/397,341

(22) Filed: Aug. 9, 2021

(65) Prior Publication Data

US 2022/0154115 A1    May 19, 2022

Related U.S. Application Data

(60) Provisional application No. 63/205,103, filed on Nov. 17, 2020.

(51) Int. Cl.
*C12G 1/032*      (2006.01)
*C12G 3/02*      (2019.01)

(52) U.S. Cl.
CPC .............. *C12G 1/0216* (2013.01); *C12G 3/02* (2013.01)

(58) Field of Classification Search
CPC ..... C12C 11/003; C12C 11/006; C12C 11/07; C12G 1/0216; C12G 1/02; C12G 3/02

USPC .......... 99/277.2, 276, 277; 100/100; 366/261
See application file for complete search history.

(56) References Cited

U.S. PATENT DOCUMENTS

| | | | |
|---|---|---|---|
| 7,299,745 B2 * | 11/2007 | Nelson ................... | B30B 9/06 100/126 |
| 2006/0156929 A1 * | 7/2006 | Nelson ................... | C12G 1/02 99/348 |
| 2014/0170263 A1 * | 6/2014 | Loos ................... | B01F 33/00 426/15 |

* cited by examiner

*Primary Examiner* — Reginald Alexander

(57) ABSTRACT

A punch down apparatus for punching a wine cap of a wine residing inside a fermentation bin is disclosed. The punch down apparatus includes a frame assembly having a frame coupled to a plurality of legs supporting the frame on a ground surface, a track assembly supported on the frame and adapted to slide relative to the frame in a first direction. In addition, the punch down apparatus includes a carriage assembly mounted on the track assembly and adapted to slide relative to the track assembly in a second direction substantially perpendicular to the first direction, and an actuator assembly attached to the carriage assembly and adapted to move along with the carriage assembly. The carriage assembly includes a punch plate arranged downwardly of the frame and adapted to contact and punch the wine cap, and a linear actuator adapted to reciprocally move the punch plate in a vertical direction.

14 Claims, 11 Drawing Sheets

APPARATUS FOR PUNCHING DOWN A WINE CAP

CROSS-REFERENCE TO RELATED APPLICATION

This application is a non-provisional application claiming the benefit of priority to U.S. Provisional Application No. 63/205,103, titled 'Wine cap punch-down tool with electric linear actuator', filed on Nov. 17, 2020, which is incorporated herein by reference in its entirety.

TECHNICAL FIELD

The present disclosure relates, generally, to a punch down apparatus. More particularly, the present disclosure pertains to a punch down apparatus suitable for punching down a cap of a fermentation mixture, such as, a wine, disposed inside a fermentation bin.

BACKGROUND

During the initial fermentation phase of wine making, a mass/cap of grape skins, stems, and seeds float to a top of the fermentation bin due to buoyancy provided by carbon dioxide bubbles. The cap needs to be kept moist and mixed with the liquid below so as to minimize oxidation and allow the wine to attain a richer color, flavor, and astringency. For facilitating the moisturization of the cap, the cap is punched downwardly. For so doing, a user typically punches the cap using a hand-held stainless steel punch tool. This process is generally preformed several times a day and hence is very labor intensive. Pneumatically-driven tools are typically available for large scale operations. However, the pneumatic tools require compressed air which is inherently inefficient and results in high operating cost.

SUMMARY

According to an aspect of the disclosure a punch down apparatus for punching a wine cap of a wine residing inside a fermentation bin is disclosed. The punch down apparatus includes a frame assembly having a frame coupled to a plurality of legs supporting the frame on a ground surface. Additionally, the punch down apparatus includes a track assembly supported on the frame and adapted to slide relative to the frame in a first direction. In addition, the punch down apparatus incudes a carriage assembly and an actuator assembly. The carriage assembly is mounted on the track assembly and adapted to slide relative to the track assembly in a second direction substantially perpendicular to the first direction. The actuator assembly is attached to the carriage assembly and adapted to move along with the carriage assembly. The actuator assembly includes a punch plate arranged downwardly of the frame and adapted to contact and punch the wine cap, and a linear actuator adapted to reciprocally move the punch plate in a vertical direction. The linear actuator is an electric actuator.

In an embodiment, the punch down apparatus further includes a track rail coupled to the frame. The track assembly slides along the track rail.

In an embodiment, the linear actuator includes a telescopic tube assembly and an electric motor connected to the telescopic tube assembly. The telescopic tube assembly has a main tube attached to the carriage assembly and a thrust tube coupled to the punch plate and adapted to telescopically extend and retract relative to the main tube. The electric motor is adapted to telescopically move the thrust tube relative to the main tube.

In an embodiment, the track assembly includes a pair of channels disposed spaced apart and substantially parallel to each other. The carriage assembly is supported on the pair of channels and slides along the channels.

In an embodiment, the track assembly includes a pair of tracks arranged inside the pair of channels. Each track includes an inverted V-shape. In addition, the carriage assembly includes a plurality of wheels, each wheel including a V-shaped groove to receive a corresponding track. The plurality of wheels is engaged with and supported on the pair of tracks and displace along with the pair of tracks.

In an embodiment, the track assembly includes a power assembly having a housing coupled to the pair of channels, and a controller arranged inside the housing and in communication with the actuator assembly to control the operation of the actuator assembly.

In an embodiment, the power assembly includes a power storage unit arranged inside the housing and adapted to provide electrical power to the actuator assembly.

In an embodiment, the power assembly includes at least one stopper extending from the housing and abutting the frame to restrict a lifting of the track assembly relative to the frame during the operation of the actuator assembly.

In an embodiment, the power assembly includes a stroke length switch to enable an adjustment of the stroke length of the actuator assembly, and a stroke speed switch to enable an adjustment of the stroke speed and associated thrust force of the actuator assembly, wherein the stroke speed switch is adapted to vary the stroke speed of the actuator assembly between a first stroke speed and a second stroke speed higher than the first stroke speed.

In an embodiment, the punch down apparatus includes a cable guide track having a first end fixedly attached to one of the pair of channels and a second end attached to the carriage assembly. An electric wiring for electrically connecting the power assembly to the actuator assembly extends along the cable guide track.

In an embodiment, the punch down apparatus further includes a counterweight attached to the frame to prevent a lifting of the frame assembly from the ground during operation of the actuator assembly.

In an embodiment, the counterweight includes a hollow cylindrical body to store a liquid, a fill port for filling the liquid inside the cylindrical body to increase a weight of the counterweight. Additionally, the counterweight includes a drain valve to drain at least a portion of the liquid from the cylindrical body to decrease the weight of the counterweight.

In an embodiment, the punch down apparatus further includes a pull rod engaged with the carriage assembly and facilitating a pulling and pushing of the carriage assembly in the second direction relative to the track assembly.

In an embodiment, each of the plurality of legs is a telescopically extending leg adapted to adjust a height of the frame relative to the ground.

In an embodiment, the frame assembly includes a plurality of wheels to facilitate a movement of the punch down apparatus on the ground.

For a more complete understanding of the present invention, reference is made to the following detailed description and accompanying drawings. In the drawings, like reference characters refer to like parts throughout the views in which.

Figure 1:
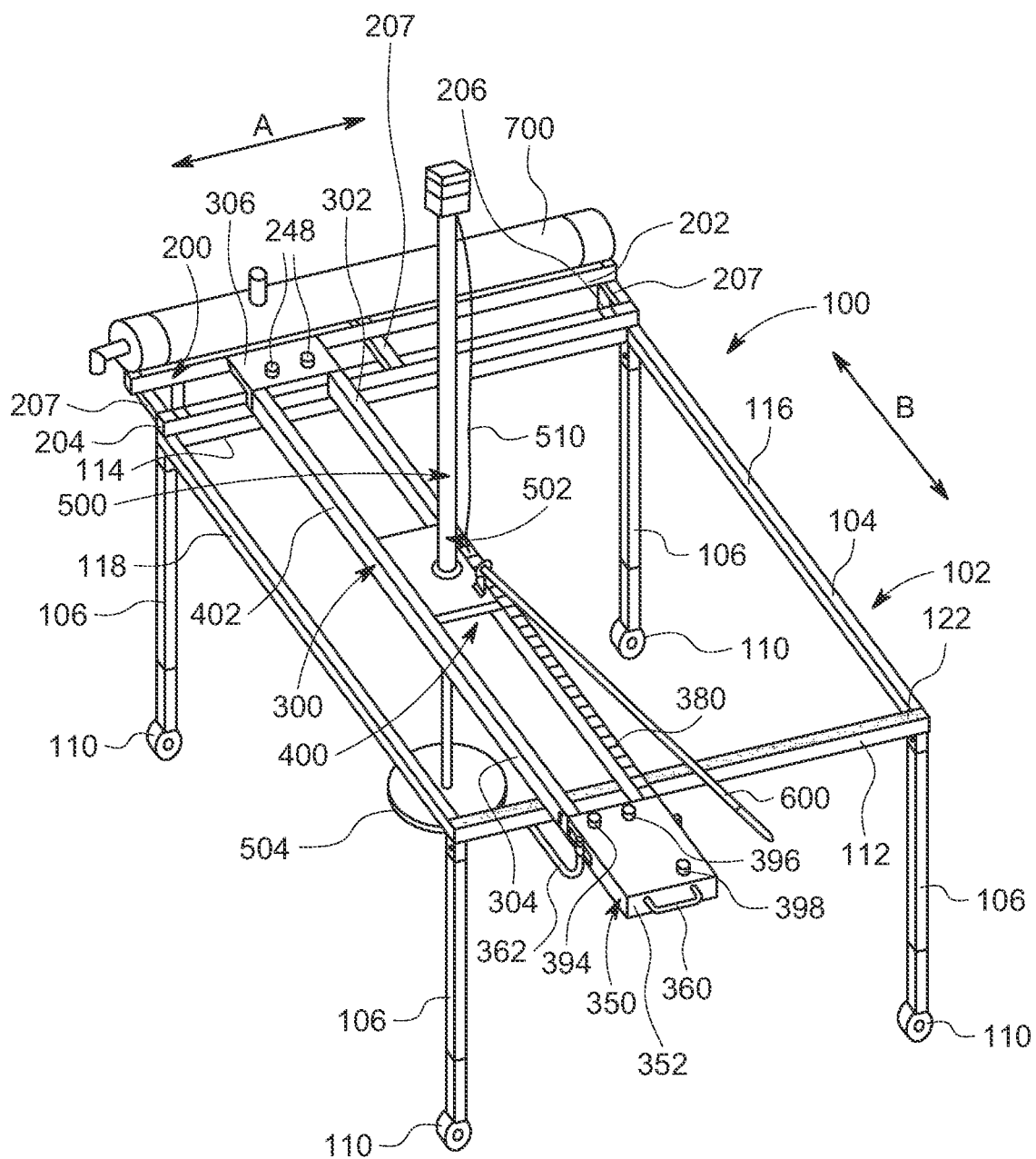
FIG. 1 illustrates a perspective view of a punch down apparatus for facilitating a punching/compressing of a cap of fermentation mixture in a fermentation bin, in accordance with an embodiment of the disclosure.

LIST OF ELEMENTS 100 apparatus
102 rectangular frame
104 frame
106 legs
110 caster
112 first member
114 second member
116 third member
118 fourth member
120 leg support
122 friction reducing layer
200 slider assembly
202 track rail
204 the strut bar
206 right angle supports
207 right angle supports
208 upper leg
210 lower leg
212 sidewall
220 first slider wheel assembly
230 second slider wheel assembly
232 wheel
236 rear track support
238 first plate
240 second plate
242 fastener
246 bolts
248 nuts
250 stop
252 stop
300 track assembly
302 first channel
304 second channel
306 flange
308 rear end
310 rear end
314 holes
320 first track
322 second track
324 lower leg
326 lower leg
330 upper leg
334 upper leg
350 power assembly
351 housing flange support
350' power assembly
352 housing
353 fastener
354 removable top plate
355 fastener
356 power storage unit
356' power supply
357 power cord
358 controller
360 handle
362 stoppers
364 bent rod
366 first portion
368 second portion
370 bracket
372 fastener
374 collar
376 screw knob
380 cable guide track
382 upper surface
384 first end
390 fastener
392 connector
399 connector
400 carriage assembly
402 base plate
404 wheels
404a first wheel
404b second wheel
408 lower surface
410 first slot
412 first longitudinal end
414 second slot
416 second longitudinal end
420 second lateral end
422 shaft
424 shaft
430 spacer
432 spacer
436 upper surface
440 extension rod
442 guide support
444 fasteners
450 mounting hole
452 step
500 actuator assembly
504 punch plate
506 telescopic tube assembly
508 electric motor
510 electric cable
520 main tube
522 thrust tube 526 mount portion
528 threaded structure
530 jamming nut
532 step
540 rod
542 threaded structure
550 disk portion
552 flange portion
554 rod adapter
560 clevis pin
562 R-clip
600 pull rod
602 handle
604 ring
606 knurled surface
700 counterweight
704 hollow cylindrical body
706 end cap
708 end cap
710 fill port
712 drain valve

DETAILED DESCRIPTION

Referring to FIG. 1, a punch down apparatus 100 suitable to compress/punch down a cap of a fermentation mixture, such as, a wine, disposed inside a fermentation bin is shown. The apparatus 100 includes a frame assembly 102, a slider assembly 200 supported on the frame assembly 102, a track assembly 300 movably supported on the frame assembly 102 and the slider assembly 200 and adapted to displace/move in a lateral direction 'A', a carriage assembly 400 movably supported on the track assembly and adapted to move in a longitudinal direction 'B' relative to the track assembly 300, and an actuator assembly 500 engaged to the carriage assembly to facilitate a compressing of a wine cap in the fermentation bin.

Figure 2:
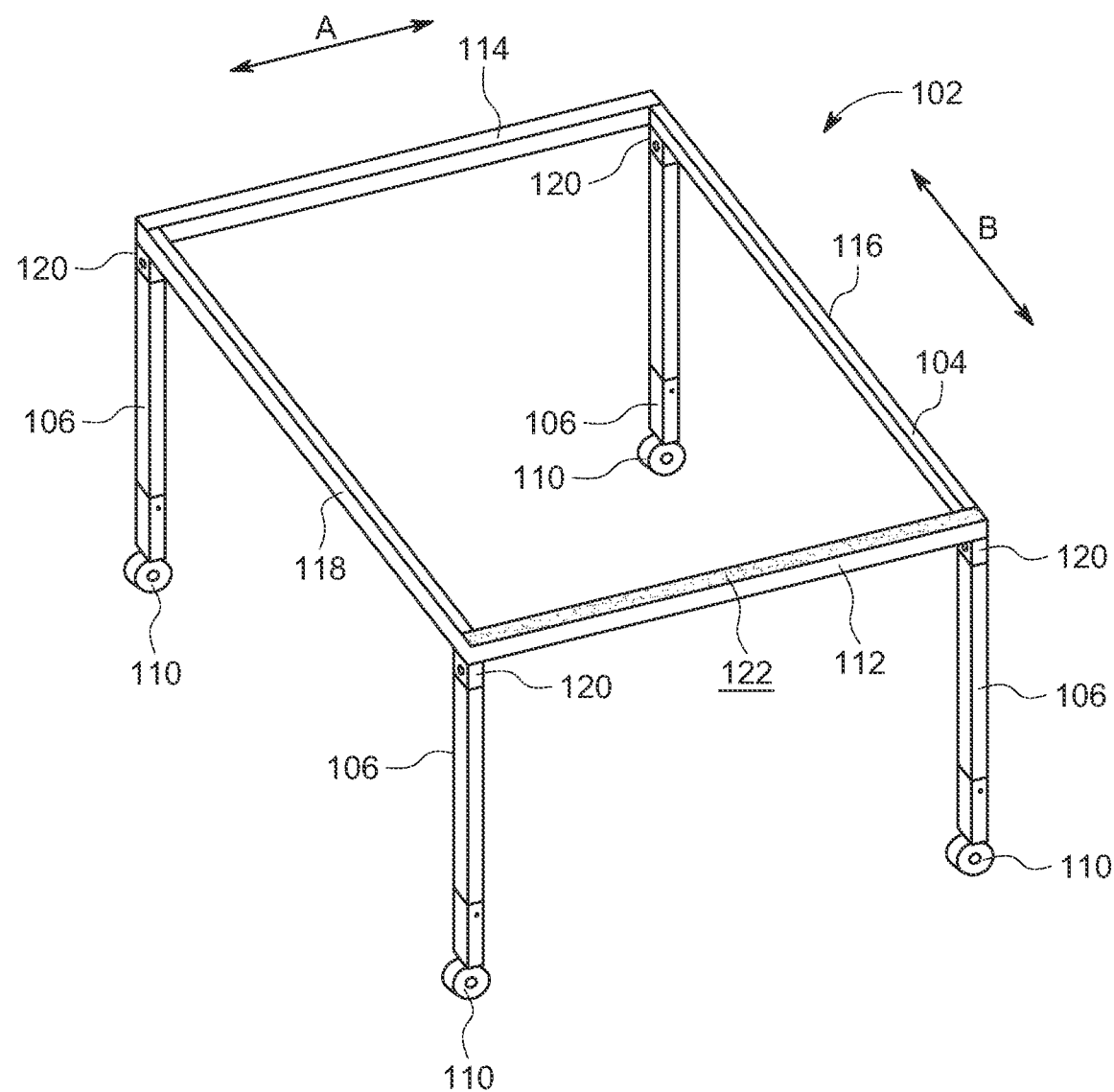
FIG. 2 illustrates a perspective view of a frame assembly of the punch down apparatus of FIG. 1, in accordance with an embodiment of the disclosure.

Referring to FIGS. 1 and 2, the frame assembly 102 includes a frame 104, and a plurality of legs 106 extending downwardly of the frame 104 and supporting the frame 104 on a surface, for example, a ground. To facilitate a movement of the apparatus 100 on the surface, the frame assembly 102 includes a plurality of castors 110 removably attached to the legs 106. It may be appreciated that one castor 110 is attached to one leg 106, and may include a brake for preventing a rolling of the castor 110 relative to the ground. In the embodiment, the legs 106 are telescopic legs to facilitate an adjustment of a height of the frame 104 relative to the surface. In some embodiments, the legs 106 are fixed legs and cannot telescopically extend or retract.

As shown, the frame 104 is a rectangular frame formed by joining four tubular members defining a cavity therebetween. As shown, the frame 104 includes a first member 112 (i.e., front member 112), a second member 114 (i.e., rear member 114)) disposed opposite to the first member 112, a third member 116 extending between the first member 112 and the second member 114, and a fourth member 118 disposed opposite to and spaced apart from the third member 116. In an embodiment, the four members 112, 114, 116, 118 may be made using square or circular tubes. Further, the frame 104 includes four leg supports 120 arranged at four corners of the frame 104, and extending downwardly of the frame 104. The four leg supports 120 facilitate the connection of the four legs 106 with the frame 104. In an embodiment, the legs 106 may be connected to the leg supports 120 via fasteners, such as, bolts. In an embodiment, the four legs 106 and the four castors 110 may be detachably coupled with the rectangular frame 104 for facilitating a compact packaging and facilitating easy transportation and storing of the apparatus 100. Further, an upper surface of the front member 112 may include a friction reducing layer 122 to allow sliding of the track assembly 300 relative to the frame 104. In an embodiment, the friction reducing layer 122 may be a coating of friction reducing material. In some embodiment, the friction reducing layer 122 may be a sheet of high density polyethylene (HDPE).

Figure 3:
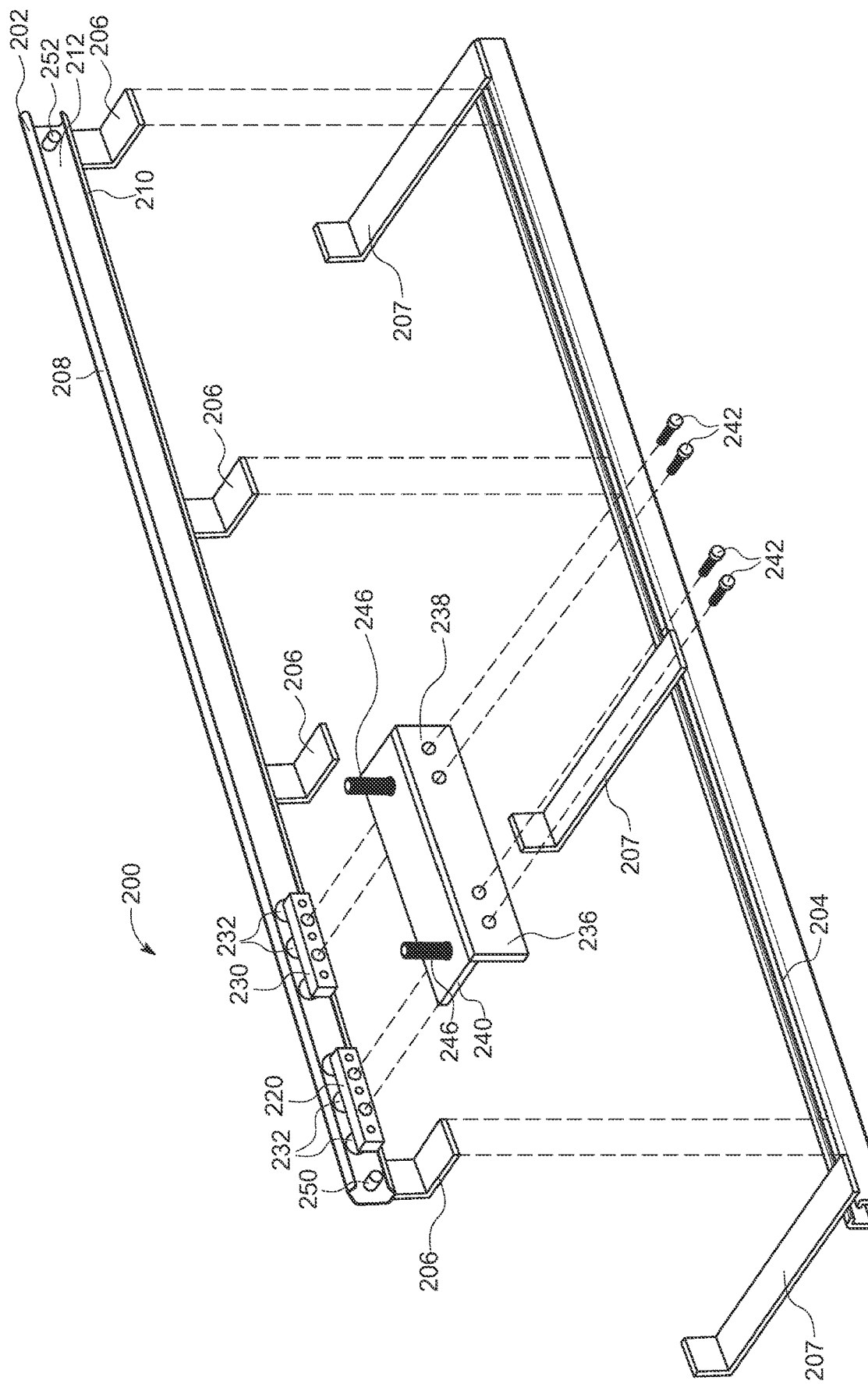
FIG. 3 illustrates an exploded view of a slider assembly of the punch down apparatus, in accordance with an embodiment of the disclosure.

Referring to FIGS. 1 and 3, the slider assembly 200 includes a track rail 202 attached to the rear member 114 of the frame 104 and extending along the entire length of the rear member 114. As shown in FIG. 1, the track rail 202 is attached to a strut bar 204 that in turn is coupled to the rear member 114. As shown, the strut bar 204 extends along the entire length of the rear member 114 and may be welded to the rear member 114. As shown, the strut bar 204 is a vertically and upwardly oriented U-shaped channel. However, it may be appreciated that strut bar 204 may include any other cross-sectional shape, such as, but not limited to, a square cross-section, a rectangular cross-section etc. Further, the track rail 202 is attached to the strut bar 204 via a plurality of right angle supports 206, for example, four right angle supports 206, and is arranged vertically and horizontally offset from the strut bar 204. Further, a plurality of right angle supports 207 are attached to the strut bar 204. The right angle supports 207 extends in a longitudinal direction away from the frame 104 and the track rail 202. Accordingly, the track rail 202 is arranged outwardly of the frame 104 and above the frame 104. As shown in FIG. 3, the track rail 202 includes a C-shaped cross-section having an upper leg 208, a lower leg 210, and a sidewall 212 extending from the upper leg 208 to the lower leg 210. Accordingly, the sidewall 212 extends in a vertical direction, while the legs 208, 210 extend in a horizontal direction from the sidewall 212 in a direction towards the front member 112 of the frame 104.

Further, the slider assembly 200 includes at least one slider wheel assembly, for example, a first slider wheel assembly 220 (also referred to as a first slider 220) and a second slider wheel assembly 230 (also referred to as a second slider 230), disposed inside the track rail 202 and adapted to slide along the length of the track rail 202. Accordingly, the sliders 220, 230 are adapted to move/displace/slide inside the track rail 202, in the lateral direction 'A', along the length of the track rail 202. As shown, wheels 232 of the sliders 220, 230 (i.e., three wheels 232 of the first slider 220 and three wheels 232 of the second slider 230) are adapted to engage/abut with the legs 208, 210 of the track rail 202. Outer two wheels 232 of each of the sliders 220, 230 engage the lower leg 210 of the track rail 202, while the inner wheel 232 of each of the sliders 220, 230 engages the upper leg 208 when a force pushes the sliders 220, 230 upwards.

Further, to secure and engage the sliders 220, 230 with the track assembly 300, the slider assembly 200 includes a rear track support 236 attached to the sliders 220, 230. As shown, the rear track support 236 includes a first plate 238 arranged substantially opposite to the sidewall 212 and attached to the sliders 220, 230 and a second plate 240 arranged substantially perpendicularly to the first plate 238 and disposed above and abutting the upper leg 208. The first plate 238 is engaged with the sliders 220, 230 via a plurality of fasteners 242, such as, bolts. Further, the rear track support 236 includes a plurality of bolts 246 extending upwardly and outwardly from the second plate 240 in a direction away from the second plate 240 to enable an engagement of the sliders 220, 230 with the track assembly 300. The rear track support 236 is attached to the track assembly 300 by engaging nuts 248 (shown in FIG. 1) with the bolts 246. The slider assembly 200 facilitates a movement of the track assembly 300 in the lateral direction 'A' between the third member 116 and the fourth member 118 of the frame 104. Further, the slider assembly 200 includes a pair of stops 250, 252 arranged at the two ends of the track rail 202 to restrict the sliding of the sliders 220, 230 within the track rail 202, and thereby contain the sliders 220, 230 within the track rail 202.

Figure 4:
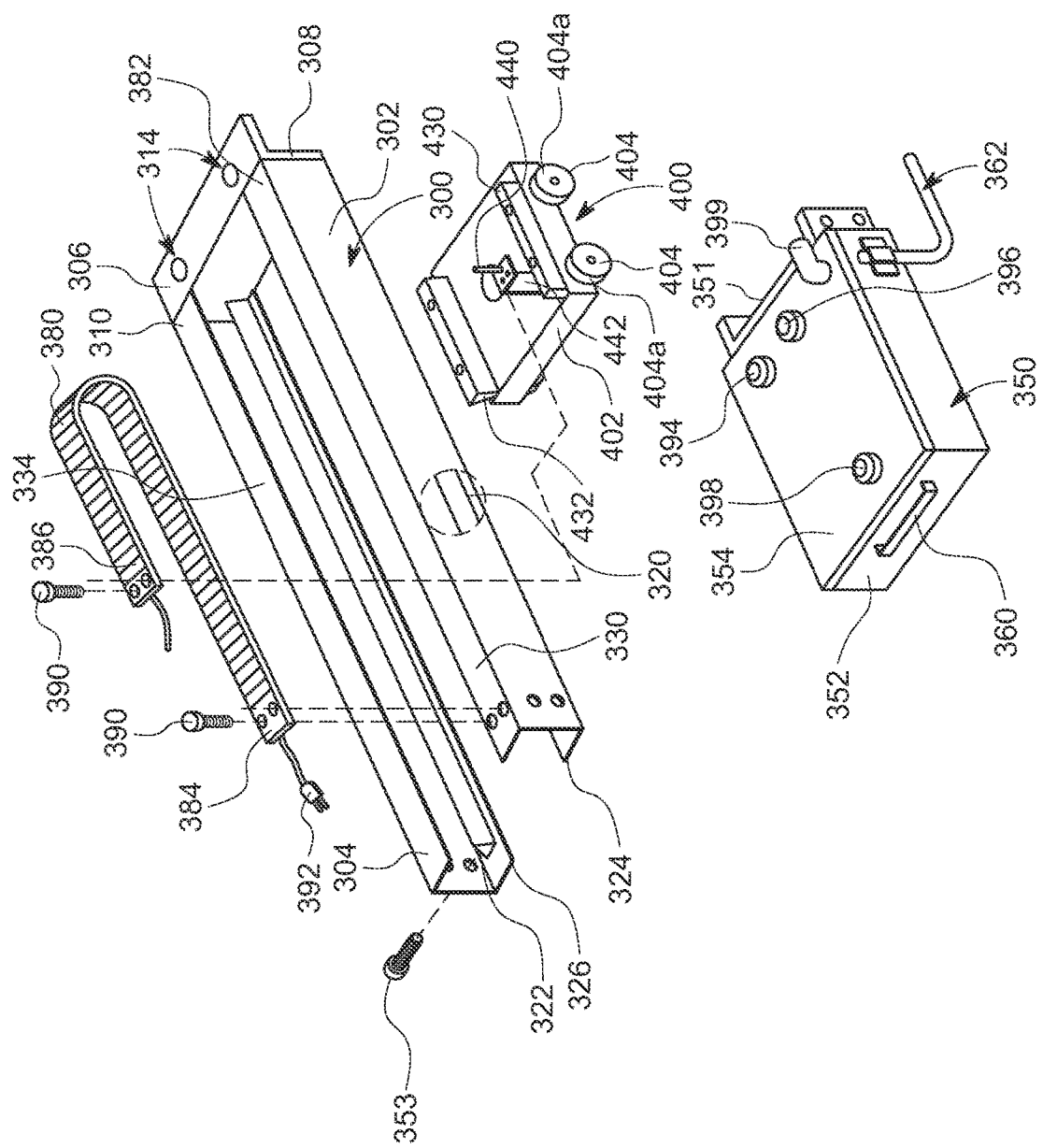
FIG. 4 illustrates a perspective view of a carriage assembly and an exploded view of a track assembly of the punch down apparatus, in accordance with an embodiment of the disclosure.

Referring back to FIGS. 1 and 4, the track assembly 300 includes a pair of horizontally oriented U-shaped channels, for example, a first channel 302 and a second channel 304 arranged spaced apart and opposite to the first channel 302, extending from the front member 112 to the rear member 114. As shown, the first channel 302 and the second channel 304 are arranged substantially parallel and facing each other and facilitates a sliding of the carriage assembly 400 between the front member 112 and the rear member 114 in the longitudinal direction T'. Accordingly, the channels 302, 304 are arranged substantially parallel to the third member 116 and fourth member 118 of the frame 104. To engage the track assembly 300 to the rear track support 236, as shown in FIGS. 1 and 4, the track assembly 300 includes a flange 306 arranged at rear ends or distal ends 308, 310 of the channels 302, 304. As shown in FIG. 4, the flange 306 includes a pair of holes 314 to receive the pair of bolts 246 extending outwardly and upwardly of the second plate 240 to facilitate the coupling/attachment of the flange 306, and hence the track assembly 300, with the rear track support 236.

Further, in the embodiment, the track assembly 300 includes a pair of inverted V-shaped tracks 320, 322 arranged inside the pair of channels 302, 304 and extending along the lengths of the pair of U-shaped channels 302, 304. As shown in FIG. 4, a first track 320 is arranged inside the first channel 302 and extends along the length of the first channel 302, while a second track 322 is arranged inside the second channel 304 and extends along the length of the second channel 304. The track 320 extends upwardly from a lower leg 324 of the first channel 302 and the track 322 extends upwardly from a lower leg 326 of the second channel 304. The tracks 320, 322 are adapted to support and guide wheels of the carriage assembly 400 and thereby facilitate the movement of the carriage assembly 400 between the first member 112 and the second member 114 along the length of the channels 302, 304 in the longitudinal direction "B".

Figure 5:
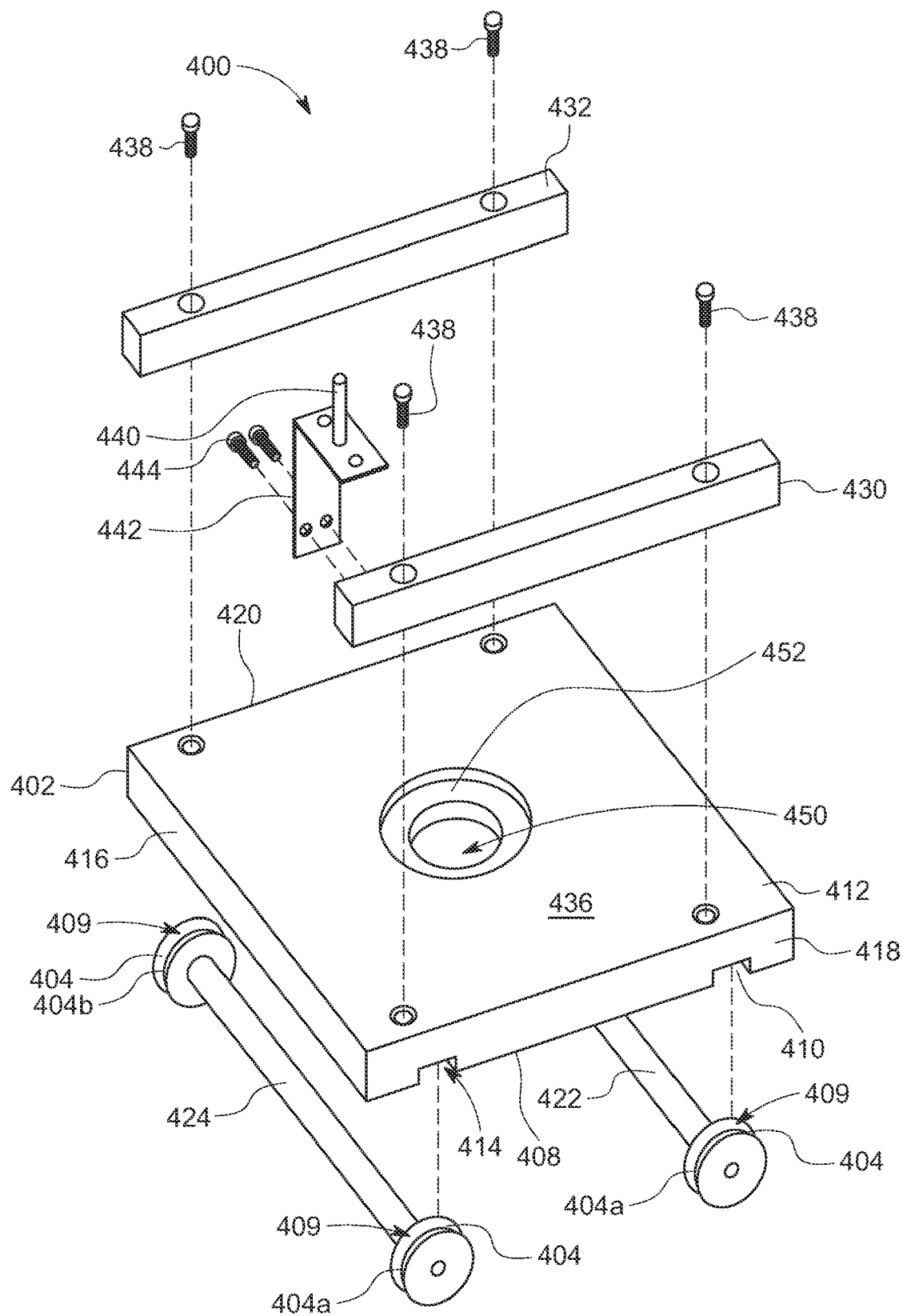
FIG. 5 illustrates an exploded view of the carriage assembly of FIG. 4, in accordance with an embodiment of the disclosure.

Referring to FIGS. 1, 4, and 5, the carriage assembly 400 is slidably arranged on the tracks 320, 322 and adapted to slide in the longitudinal direction 'B' relative to the track assembly 300. Further, the carriage assembly 400 is engaged with the actuator assembly 500 and supports the actuator assembly 500 on the frame 104. As shown in FIGS. 4 and 5, the carriage assembly 400 includes a base plate 402 supported on a plurality of wheels 404. The plurality of wheels includes at least one first wheel 404a adapted to engage with the first track 320 and at least one second wheel 404b adapted to engage with the second track 322. As shown, each of the wheels 404 includes a V-shaped groove 409 adapted to engage with and rest on the tracks 320, 322. The wheels 404 rotate about respective central axis and roll on the tracks 320, 322 to facilitate the displacement/sliding of the carriage assembly 400 along the length of the channels 302, 304. For engaging the wheels 404 with the base plate 402, a lower surface 408 of the base plate 402 defines a pair of slots, for example, a first slot 410 arranged proximate to a first longitudinal end 412 of the base plate 402 and a second slot 414 arranged proximate to a second longitudinal end 416 of the base plate, extending from a first lateral end 418 to a second lateral end 420 arranged opposite to the first lateral end 418. The first lateral end 418 is arranged substantially parallel to the second lateral end 420 and is arranged substantially parallel to the first channel 302 and the second channel 304 of the track assembly 300.

The slots 410, 414 are adapted to receive a pair of shafts 422, 424 that are connected to the wheels 404. Additionally, the carriage assembly 400 includes a pair of spacers 430, 432 attached to the base plate 402 and extending outwardly and upwardly from an upper surface 436 of the base plate 402. A first spacer 430 of the first pair of spacers 430, 432 extends along a length of the first lateral end 418, while a second spacer 432 of the pair of spacers 430, 432 extends along a length of the second lateral end 420 and is arranged spaced apart and substantially parallel to the first spacer 430. The spacers 430, 432 may be attached to the base plate 402 by a plurality of fasteners 438 (shown in FIG. 5). In an assembly of the carriage assembly 400 with the track assembly 300, the first spacer 430 is arranged inside the first channel 302 and may abut an upper leg 330 (shown in FIG. 4) of the first channel 302, while the second spacer 432 is arranged inside the second channel 304 and may abut an upper leg 334 (shown in FIG. 4) of the second channel 304. Accordingly, the spacers 430, 432 secure the carriage assembly 400 within the channels 302, 304 when the base plate 402 is pushed upwards during the operation of the actuator assembly 500. Also, the spacers 430, 432 may include low friction material to reduce friction between the contact surfaces of the spacers 430, 432 and the channels 302, 304. Further, the carriage assembly 400 includes an extension rod 440 mounted on the first spacer 430 using a guide support 442 and a plurality of fasteners 444.

Figure 6:
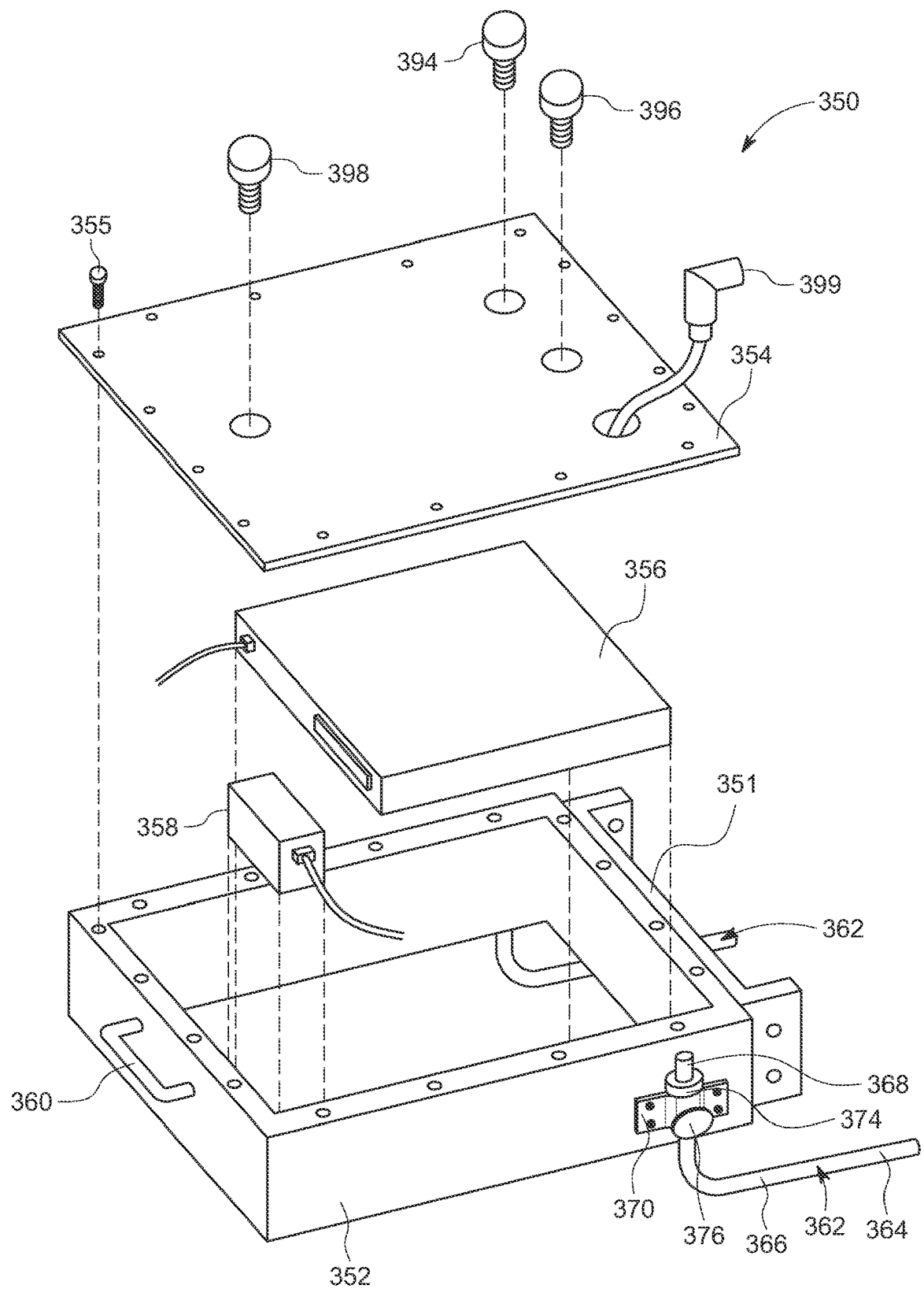
FIG. 6 illustrates an exploded view of a power assembly of the track assembly, in accordance with an embodiment of the disclosure.

Referring back to FIGS. 1 and 4, the track assembly 300 includes a power assembly 350 having a housing 352 or enclosure attached to the channels 302, 304 and arranged at front ends of the channels 302, 304. In the embodiment, the housing 352 is attached to the channels 302, 304 by way of a housing flange support 351 and a plurality of fasteners 353. The housing 352 is adapted to house power components and control components for powering the actuator assembly 500 and includes a removable top plate 354 held in place with fasteners 355. As shown in FIG. 6, the power assembly 350 includes a power storage unit 356, for example, a battery, to provide electric power to the actuator assembly 500, and a controller 358 to control the actuator assembly 500. In some embodiments, the controller 358 may also control movements of the carriage assembly 400 relative to the tracks 320, 322, and the movement and the position of the track assembly 300 relative to the track rail 202 by controlling the sliders 220, 230.

Figure 7:
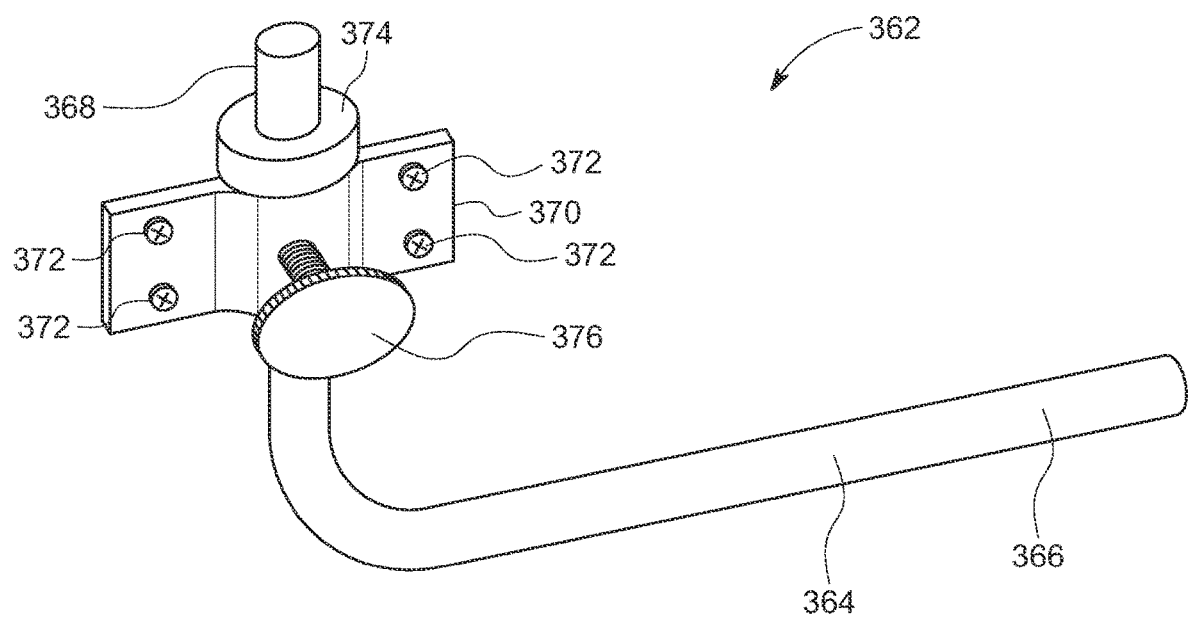
FIG. 7 illustrates an enlarged view of a stopper of the power assembly, in accordance with an embodiment of the disclosure.

In addition, the power assembly 350 may include a handle 360 attached to the housing 352 to enable an operator to move the track assembly 300 in the lateral direction 'A' relative to the frame 104. Further, the power assembly 350 includes a pair of stoppers 362, for example, right angle hold downs 362, arranged on both sides of the housing 352 and adapted to contact the bottom surface of the front member 112 to prevent/restrict an upward movement of the track assembly 300 relative to the frame 104 during the operation of the actuator assembly 500. As best shown in FIGS. 6 and 7, each stopper 362 may include a bent rod 364 having a first portion 366 extending outwardly in the longitudinal direction from the rear of the housing 352 and adapted to contact the bottom surface of the front member 112 of the frame 104, and a second portion 368 disposed at an angle, for example, at a right angle, relative to the first portion 366 and connected to a sidewall of the housing 352. The second portion 368, and hence the bent rod 364, may be connected to the housing 352 via a bracket 370 and a plurality of fasteners 372. Additionally, the stopper 362 may include a collar 374 welded to the second portion 368 of the bent rod 364 contacting the bracket 370, and a retaining screw knob 376 for tightening and securely positioning the bent rod 364 within the bracket 370.

Figure 8:
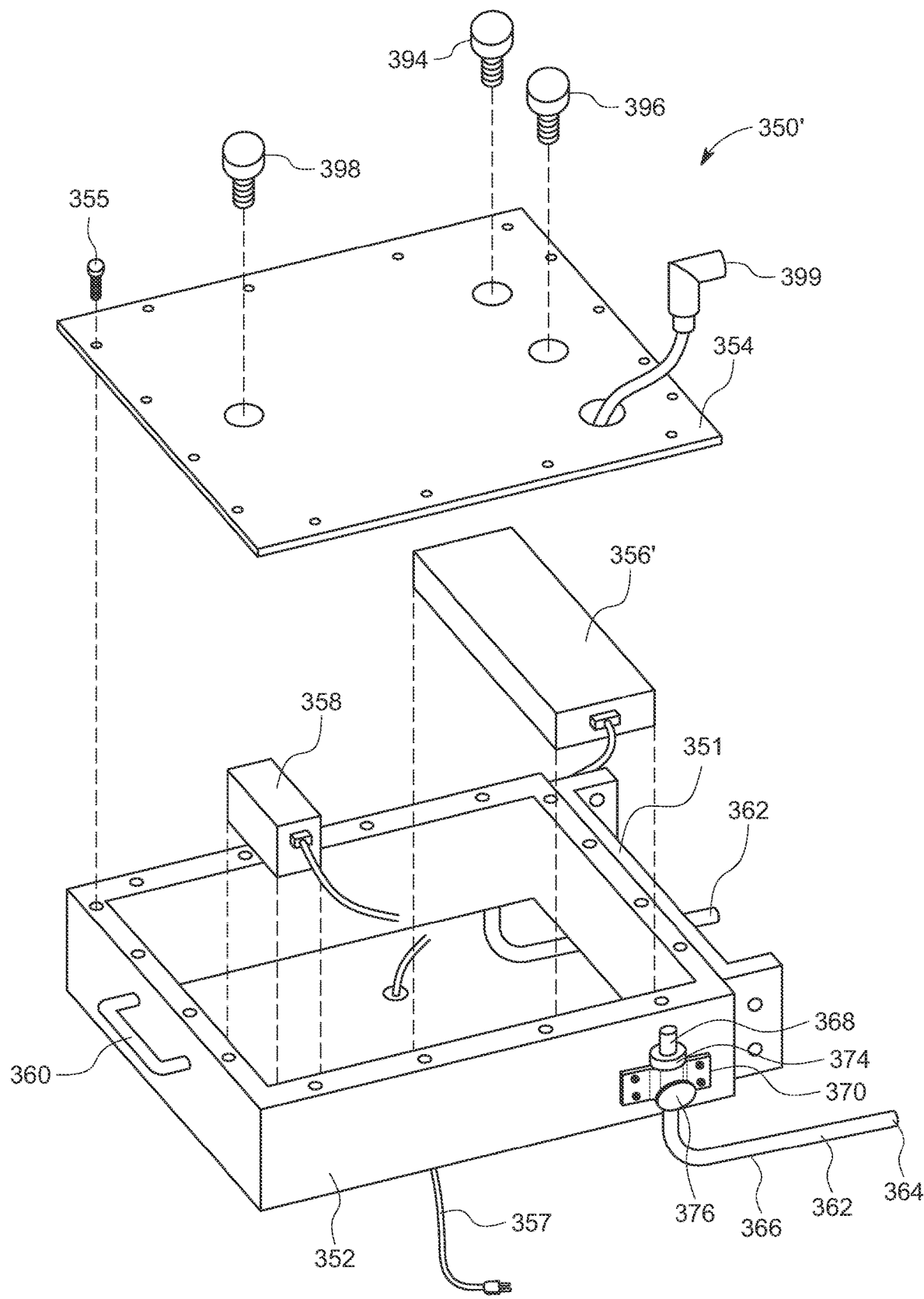
FIG. 8 illustrates an exploded view of a power assembly of the track assembly, in accordance with an embodiment of the disclosure.

Referring to FIG. 8, an alternative power assembly 350' is shown. The power assembly 350' is similar to the power assembly 350 except that the power storage unit 356 is omitted from the power assembly 350' and the power assembly 350' facilitates a supply of electric power to the actuator assembly 500 from a utility power line. Instead, the power assembly 350' includes a power supply 356' to convert alternating current based electric power received from the utility power line to the direct current based electric power and provide the direct current based power to the actuator assembly 500. The power supply 356' is coupled with the utility power line via a power cord 357.

Figure 9:
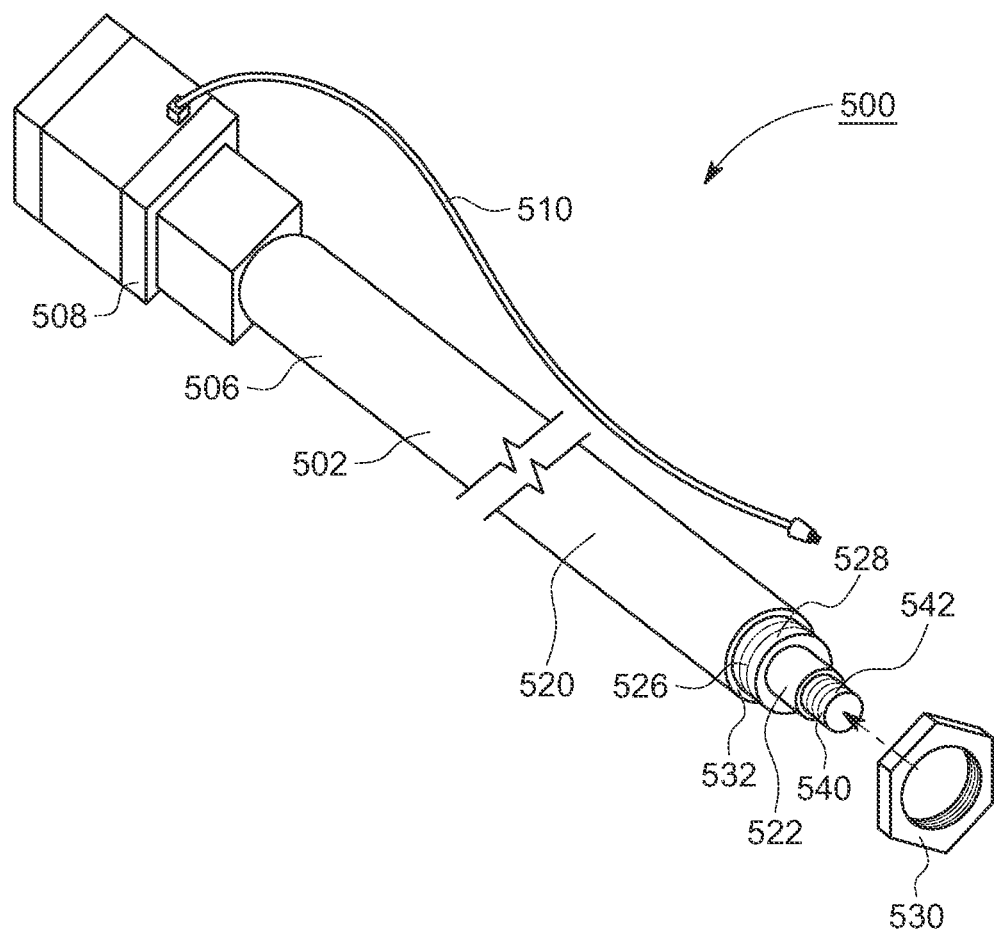
FIG. 9 illustrates a linear actuator of the actuator assembly, in accordance with an embodiment of the disclosure.

Referring back to FIG. 1, the actuator assembly 500 is connected to the carriage assembly 400 and supported by the carriage assembly 400 and includes a linear actuator 502 (best shown in FIG. 9) and a punch plate 504 (best shown in FIG. 10) releasably engaged with the linear actuator 502. As shown, the linear actuator 502 is engaged/secured to the base plate 402 of the carriage assembly 400 such that the punch plate 504 is arranged below or downwardly of the base plate 402. Referring to FIG. 9, the linear actuator 502 includes a telescopic tube assembly 506 and an electric motor 508, for example, a stepper motor, engaged with the telescopic tube assembly 506. The electric motor 508 is electrically connected to the power storage unit 356 or the power supply 356' via an electric cable 510. Further, the electric motor 508 is also in communication with the controller 358. The controller 358 may control a speed and a stroke length of the linear actuator 502 by controlling the electric motor 508. In the embodiment, the electric power is provided to the electric motor 508 via the electric cable 510 extending along a cable guide track 380 (shown in FIG. 4) of the track assembly 300. Referring back to FIG. 4, the cable guide track 380 is arranged or laid on an upper surface 382 of the first channel 302, and includes a first end 384 connected to the first channel 302 at a location proximate to the housing 352 and a second end 386 connected to the guide support 442 of the carriage assembly 400. The cable guide track 380 is engaged with the first channel 302 and the guide support 442 using a plurality of fasteners 390. A portion of the cable guide track 380 runs along the length of the first channel 302 and is fixedly attached to the first channel 302, while a remaining portion of the cable guide track 380 is adapted to move between an extended position and a folded position. The cable guide track 380 is adapted to move to the extended portion as the carriage assembly 400 moves towards the rear member 114 of the frame 104 and moves to the folded position as the carriage assembly 400 moves proximate to the front member 112. The wiring is connected to the power storage unit 356 or the power supply 356' via a connector 392.

Referring again to FIG. 9, the telescopic tube assembly 506 includes a main tube 520 and a thrust tube 522 adapted to telescopically extend and retract relative to the main tube 520. The main tube 520 is connected to the electric motor 508 at one end and includes a mount portion 526 having a threaded structure 528. The mount portion 526 facilitates an engagement of the telescopic tube assembly 506, and hence the actuator assembly 500, with the base plate 402 (i.e., the carriage assembly 400). The mount portion 526 extends inside and through a mounting hole 450 (shown in FIG. 5) of the base plate 402 such that a portion of the threaded structure 528 is arranged downwardly of the base plate 402. The mount portion 526, and hence the telescopic tube assembly 506, is engaged and secured with the base plate 402 by attaching a jamming nut 530 to the threaded structure 528. In the assembly, the jamming nut 530 abuts the lower surface 408 of the base plate 402. In the embodiment, the mounting hole 450 is a counterbore hole defining a step 452 (shown in FIG. 5) to which a step 532 of the main tube 520 abuts. Additionally, the telescopic tube assembly 506 includes a rod 540 extending outwardly in a longitudinal direction from the thrust tube 522. The rod 540 facilitates an attachment of the linear actuator 502 with the punch plate 504. In the embodiment, the rod 540 includes a threaded structure 542 to enable a threaded engagement of the telescopic tube assembly 506 with the punch plate 504.

Figure 10:
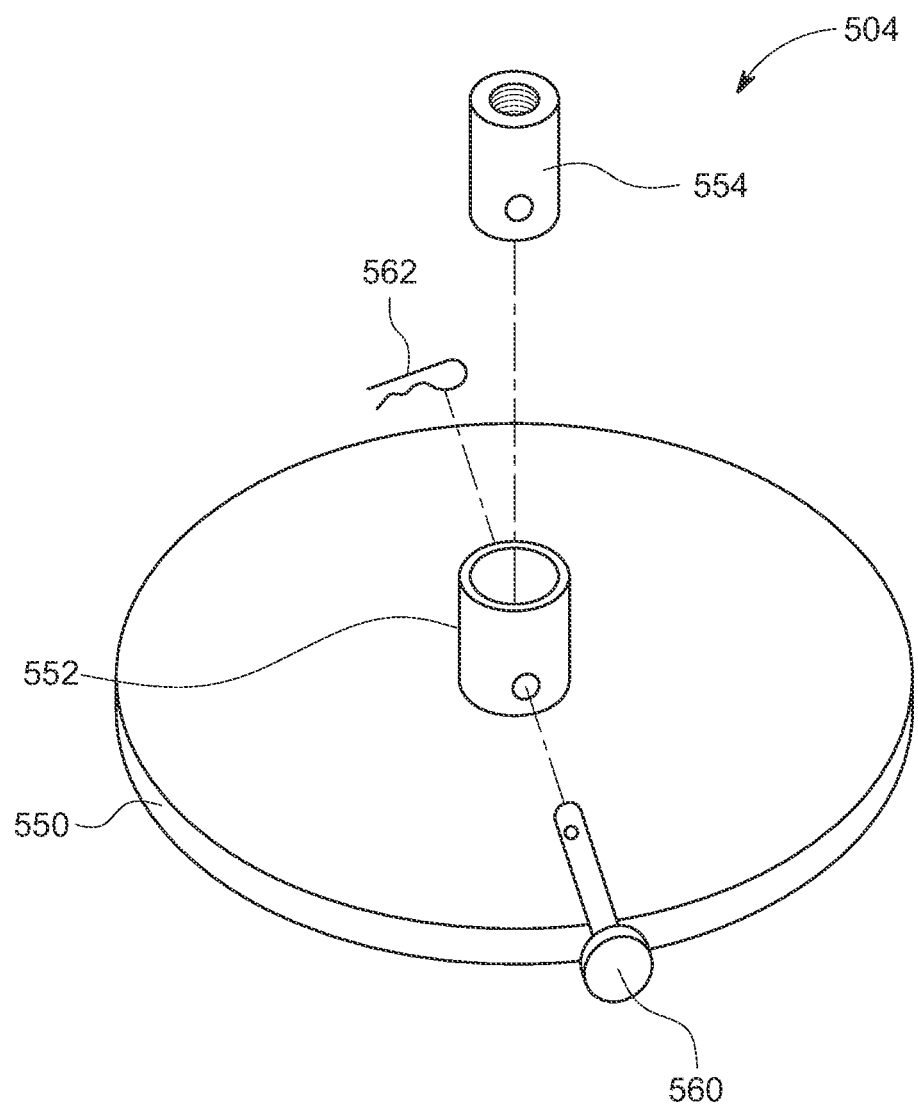
FIG. 10 illustrates a punch plate of the actuator assembly, in accordance with an embodiment of the disclosure.

Referring now to FIG. 10, the punch plate 504 is shown. The punch plate 504 include a disk portion 550 and a flange portion 552 adapted to couple to the telescopic tube assembly 506. The disk portion 550 is adapted to contact the cap of the wine to punch down the cap as the thrust tube 522 is telescopically moved relative to the main tube 520. The flange portion 552 is connected to the threaded rod 540 via a rod adapter 554 that is in threaded engagement with the rod 540. The flange portion 552 is connected to the rod adapter 554 via a clevis pin 560. Further, an R-clip 562 is inserted inside the clevis pin 560 to lock the clevis pin with the flange portion 552 and the rod adapter 554. In an embodiment, the rod 540 may be in a threaded engagement with the flange portion 552. In such a case, the rod adapter 554 and the clevis pin 560 may be omitted.

To control a stroke length of the linear actuator 502 (i.e., the thrust tube 522) and a stroke speed of the linear actuator 502 (i.e., the thrust speed), the power assembly 350, as shown in FIGS. 1, 4, and 6) may include a stroke length switch 394 for selecting and/or controlling a stroke length of the linear actuator 502 (i.e., the thrust tube 522) and a stroke speed switch 396 for selecting and/or controlling the speed of the linear actuator 502. The controller 358 is in communication with the stroke length switch 394 and the stroke speed switch 396, and controls the operation of the linear actuator 502 based on the setting or position of the stroke length switch 394 and the stroke speed switch 396. It may be appreciated that the positions or settings of the stroke length switch 394 and the stroke speed switch 396 is selected by the operator. Also, by changing/selecting the stroke speed, the operator is changing/selecting a torque provided by the electric motor 508, and hence selecting or changing a thrust force applied by the punch plate 504 on the wine cap. Accordingly, a low stroke speed corresponds to a high thrust force and a relatively high speed corresponds to a relatively low thrust force. A high thrust force is needed when fermenting mass (i.e., the cap) is dense and viscous, while a relatively low thrust force is needed when fermenting mass (i.e., the cap) is relatively less dense and viscous. In an embodiment, the actuator assembly 500 may include a first stroke speed and a second stroke speed higher than the first stroke speed and the stroke speed switch 396 is adapted to vary the stroke speed of the actuator assembly 500 between the first stroke speed and the second stroke speed. The power assembly 350 also includes a start switch 398 for the starting and stopping the operation of the actuator assembly 500. Accordingly, the start switch 398 may be an ON-OFF switch for controlling a flow of electricity to the electric motor 508 and hence the actuator assembly 500. Additionally, the power assembly 350 may include an electrical connector 399 adapted to connect with the connector 392 to enable an electrical connection of the electric motor 508 with the power storage unit 356 or the power supply 356'.

Figure 11:
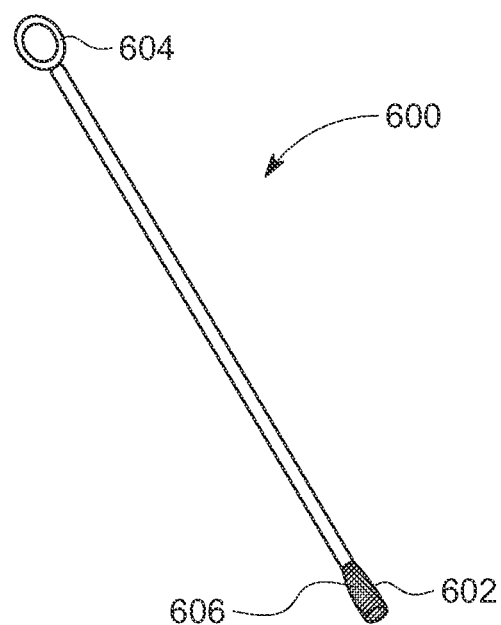
FIG. 11 illustrates a perspective view of a pull rod of the punch down apparatus, in accordance with an embodiment of the disclosure.

Referring again to FIG. 1, the apparatus 100 may include a pull rod 600 connected to the carriage assembly 400 for the pulling and pushing the carriage assembly 400 along the tracks 320, 322. As shown in FIG. 11, the pull rod 600 includes a handle 602 to hold the pull rod 600 by a user and a ring 604 for facilitating an engagement of the pull rod 600 with the extension rod 440. In an embodiment, the handle 602 includes a knurled surface 606 to provide an enhanced grip to the user.

Figure 12:
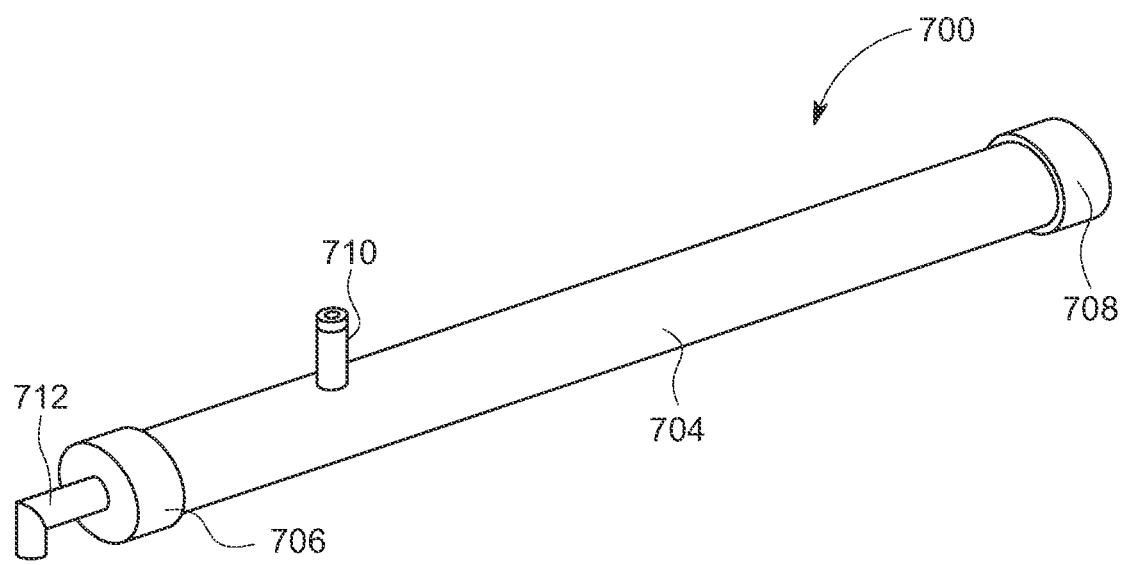
FIG. 12 illustrates a perspective view of a counterweight of the punch down apparatus, in accordance with an embodiment of the disclosure.

Moreover, referring to FIG. 1 and FIG. 3, the apparatus 100 includes a counterweight 700 coupled to the rear member 114 of the frame 104, and arranged rearwardly of the track rail 202 of the slider assembly 200. As shown the counterweight 700 is connected to the strut bar 204 via a plurality of right angle supports 207, for example, three first right angle supports 207. The counterweight 700 holds the frame 104 down during the operation of the actuator assembly 500. As shown in FIG. 12, the counterweight 700 includes a hollow cylindrical body 704, a pair of end caps 706, 708 coupled to the ends of the cylindrical body 704, a fill port 710, and a drain valve 712 arranged at the end cap 706. The cylindrical body 704 is adapted to store a fluid, such as, water to provide a necessary weight to the counterweight 700. The weight can be adjusted by filling the water inside the cylindrical body 704 through the fill port 710 or draining the water from the cylindrical body 704 via the drain valve 712. In an embodiment, the cylindrical body 704 may be made using ABS plastic or any other suitable material known in the art.

A working of the apparatus 100 is now explained. For punching of the wine cap inside the fermentation bin, the punch down apparatus 100 is suitably positioned relative to a fermentation bin. For so doing, the apparatus 100 is moved/rolled and positioned such that the fermentation bin is arranged below the frame 104. Thereafter, the apparatus 100 is secured at the position by engaging the brakes of the castors 110. In some embodiments, an operator may adjust the height of the frame 104 from the ground by adjusting the telescopic legs 106 depending on the height of the fermentation bin. Subsequently, the operator may position the actuator assembly 500 directly above the fermentation bin by sliding the track assembly 300 along the track rail 202 in the direction 'A' and by displacing the carriage assembly 400 relative to the pair of channels 302, 304 in the direction 'B'. Afterwards, the operator may press the start switch 398 to start the actuator assembly 500, i.e., to initiate the telescopic movement of the thrust tube 522 relative to the main tube 520. In some implementations, before pressing the start switch 398, the operator may operate/adjust the stroke length switch 394 and/or the stroke speed switch 396 to select a desired stroke length and a desired stroke speed of the linear actuator 502 (i.e., the thrust tube 522). The stroke speed is selected based on a density and viscosity of the fermented mass (i.e., the cap). Due to the telescopic movements of the thrust tube 522, the cap of the fermenting mixture, i.e., the wine, is compressed and punched down by the disk portion 550 of the punch plate 504. The position of the punch plate 504 may then be re-adjusted within the fermentation bin by moving the carriage assembly 400 and the track assembly 300 to enable a proper compression/punching of the cap.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A punch down apparatus for punching a wine cap of a wine residing inside a fermentation bin, the punch down apparatus comprising:
a frame assembly having a frame coupled to a plurality of legs supporting the frame on a ground surface, wherein each of the plurality of legs is a telescopic leg adapted to adjust a height of the frame relative to the ground surface;
a track assembly supported on the frame and adapted to slide relative to the frame in a first direction;
a carriage assembly mounted on the track assembly and adapted to slide relative to the track assembly in a second direction substantially perpendicular to the first direction; and
an actuator assembly attached to the carriage assembly and adapted to move along with the carriage assembly, the actuator assembly including
a punch plate arranged downwardly of the frame and adapted to contact and punch the wine cap, and
a linear actuator adapted to reciprocally move the punch plate in a vertical direction, wherein the linear actuator is an electric actuator.

2. The punch down apparatus of claim 1 further including a track rail coupled to the frame, wherein the track assembly slides along the track rail.

3. The punch down apparatus of claim 1, wherein the linear actuator includes
a telescopic tube assembly having a main tube attached to the carriage assembly and a thrust tube coupled to the punch plate and adapted to telescopically extend and retract relative to the main tube, and
an electric motor connected to the telescopic tube assembly and adapted to telescopically move the thrust tube relative to the main tube.

4. The punch down apparatus of claim 1, wherein the track assembly includes a pair of channels arranged spaced apart and substantially parallel to each other, wherein the carriage assembly is supported on the pair of channels and slides along the channels.

5. The punch down apparatus of claim 4, wherein
the track assembly includes a pair of tracks arranged inside the pair of channels, wherein each track includes an inverted V-shape, and
the carriage assembly includes a plurality of wheels, each wheel includes a V-shaped groove to receive a corresponding track, wherein the plurality of wheels is engaged with and supported on the pair of tracks and displace along with the pair of tracks.

6. The punch down apparatus of claim 4, wherein the track assembly includes a power assembly having
a housing coupled to the pair of channels, and a controller arranged inside the housing and in communication with the actuator assembly to control an operation of the actuator assembly.

7. The punch down apparatus of claim 6, wherein the power assembly includes a power storage unit arranged inside the housing and adapted to provide electrical power to the actuator assembly.

8. The punch down apparatus of claim 6, wherein the power assembly includes at least one stopper extending from the housing and abutting the frame to restrict a lifting of the track assembly relative to the frame during the operation of the actuator assembly.

9. The punch down apparatus of claim 6, wherein the power assembly includes
  a stroke length switch to enable an adjustment of a stroke length of the actuator assembly, and
  a stroke speed switch to enable an adjustment of a stroke speed of the actuator assembly, wherein the stroke speed switch is adapted to vary the stroke speed of the actuator assembly between a first stroke speed and a second stroke speed higher than the first stroke speed.

10. The punch down apparatus of claim 4 further including a cable guide track having a first end fixedly attached to one of the pair of channels and a second end attached to the carriage assembly, wherein an electric wiring for electrically connecting the power assembly to the actuator assembly extends along the cable guide track.

11. The punch down apparatus of claim 1 further including a counterweight attached to the frame to prevent a lifting of the frame assembly from the ground surface during operation of the actuator assembly.

12. The punch down apparatus of claim 11, wherein the counterweight includes
  a hollow cylindrical body to store a liquid,
  a fill port for filling the liquid inside the cylindrical body to increase a weight of the counterweight, and
  a drain valve to drain at least a portion of the liquid from the cylindrical body to decrease the weight of the counterweight.

13. The punch down apparatus of claim 1 further including a pull rod engaged with the carriage assembly and facilitates a pulling and pushing of the carriage assembly in the second direction relative to the track assembly.

14. The punch down apparatus of claim 1, wherein the frame assembly includes a plurality of wheels to facilitate a movement of the punch down apparatus on the ground surface.

* * * * *